US009670818B2

(12) United States Patent
Mutti, Jr. et al.

(10) Patent No.: US 9,670,818 B2
(45) Date of Patent: Jun. 6, 2017

(54) AIR-ASSIST DOSING SYSTEM HAVING PRIMING DETECTION

(71) Applicant: Caterpillar Inc., Peoria, IL (US)

(72) Inventors: James Harris Mutti, Jr., Germantown Hills, IL (US); Shivsinh Hitendrasinh Parmar, Peoria, IL (US); Satya Ramakrishna Manda Venkata Naga, Dunlap, IL (US); Purna Chander Nalla, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 122 days.

(21) Appl. No.: 14/820,743

(22) Filed: Aug. 7, 2015

(65) Prior Publication Data

US 2017/0037763 A1    Feb. 9, 2017

(51) Int. Cl.
  *F01N 3/20*    (2006.01)
  *F01N 11/00*    (2006.01)

(52) U.S. Cl.
  CPC .............. *F01N 11/00* (2013.01); *F01N 3/206* (2013.01)

(58) Field of Classification Search
  CPC ................................. F01N 11/00; F01N 3/206
  See application file for complete search history.

(56) References Cited

U.S. PATENT DOCUMENTS

| | | | |
|---|---|---|---|
| 7,665,347 B2 * | 2/2010 | Sasanuma | F01N 3/2066 73/61.46 |
| 7,975,470 B2 * | 7/2011 | Hirata | B01D 53/9431 60/277 |
| 8,459,012 B2 | 6/2013 | Sun et al. | |
| 8,776,503 B2 * | 7/2014 | Wang | F01N 3/208 60/295 |
| 8,881,507 B2 * | 11/2014 | Yan | F01N 3/2066 60/274 |
| 8,899,021 B2 | 12/2014 | Dingle et al. | |
| 8,943,808 B2 | 2/2015 | Li et al. | |
| 9,222,849 B2 * | 12/2015 | Peucat | F01N 3/2066 |
| 9,243,755 B2 * | 1/2016 | Lawrence | F01N 3/2066 |
| 9,255,512 B2 * | 2/2016 | Huang | F16K 7/12 |

(Continued)

FOREIGN PATENT DOCUMENTS

| | | |
|---|---|---|
| CN | 202578854 U | 12/2012 |
| FR | 2981689 A1 | 4/2013 |
| WO | WO 2014/143851 A1 | 9/2014 |

*Primary Examiner* — Freddie Kirkland, III
(74) *Attorney, Agent, or Firm* — Finnegan, Henderson, Farabow, Garrett & Dunner, LLP

(57) ABSTRACT

A reductant dosing system is disclosed as having a pump, and suction, discharge, and return passages. The system may also have a return valve, an air passage, and an air valve. The system may additionally have an air passage pressure sensor, a discharge passage pressure sensor, and a controller. The controller may be configured to calculate a first average pressure inside the discharge passage while the pump is off, the air valve is open, and the return valve is closed; and calculate a second average pressure inside the discharge passage while the pump is off, the air valve is open, and the return valve is open. The controller may also be configured to determine a pressure drop inside the discharge passage based on the first and second average pressures, and to determine that priming is successful based on the pressure drop and pressures of the discharge and air passages.

26 Claims, 3 Drawing Sheets

(56) References Cited

U.S. PATENT DOCUMENTS

| | | | |
|---|---|---|---|
| 9,399,940 B2* | 7/2016 | Liljestrand | F01N 3/208 |
| 9,404,408 B2* | 8/2016 | Bauer | B01D 53/90 |
| 9,546,584 B2* | 1/2017 | Qi | F01N 3/208 |
| 9,546,585 B2* | 1/2017 | Wang | F01N 3/208 |
| 2007/0113625 A1* | 5/2007 | Sasanuma | F01N 3/2066 |
| | | | 73/61.46 |
| 2007/0266703 A1* | 11/2007 | Hirata | B01D 53/9431 |
| | | | 60/299 |
| 2008/0034733 A1 | 2/2008 | Miller et al. | |
| 2008/0295492 A1 | 12/2008 | Karkkainen et al. | |
| 2009/0248361 A1* | 10/2009 | Franco | F01N 3/0253 |
| | | | 702/182 |
| 2013/0032214 A1 | 2/2013 | Saby et al. | |
| 2013/0180323 A1 | 7/2013 | Peucat et al. | |
| 2014/0352280 A1* | 12/2014 | Qi | F01N 3/2066 |
| | | | 60/274 |
| 2015/0052878 A1* | 2/2015 | Qi | F01N 3/2066 |
| | | | 60/277 |

* cited by examiner

US 9,670,818 B2

AIR-ASSIST DOSING SYSTEM HAVING PRIMING DETECTION

TECHNICAL FIELD

The present disclosure is directed to a reductant dosing system and, more particularly, to an air-assist reductant dosing system having priming detection.

BACKGROUND

Reductant dosing systems are typically used to reduce $NO_x$ emissions in large machines where space and weight considerations are not a concern, such as, for example, in locomotives and. stationary power generation applications. The reductant is stored in a tank located on the machine and, as the machine operates and produces exhaust, pumped from the tank into the machine's exhaust system. The reductant reacts with exhaust at high temperatures to affect a selective catalytic reduction (SCR) of $NO_x$ within the exhaust.

In order to comply with governmental exhaust regulations, precise control of reductant dosing may be required. This precision can be affected by air inside the dosing system. In particular, if air becomes trapped inside passages, valves, and/or the reductant pump of the dosing system, reductant may be displaced by the air. When this happens, an actual amount of reductant injected into the exhaust may be less than an expected amount. In addition, because air is compressible, the trapped air may act as a spring that absorbs the pumping action of the system, thereby making injection unpredictable, intermittent, or even impossible.

Another problem associated with conventional reductant dosing systems involves contamination of the system. Contamination can be caused by overheating or overcooling of the reductant during operation in extreme conditions. For example, overheating can cause the reductant to gel, while overcooling can cause formation of ice crystals. Both of these conditions can result in restrictions or clogging of dosing system components. When dosing system components are restricted or clogged, dosing precision can be reduced.

One way to improve precision in reductant dosing is disclosed in U.S. Patent Application Publication No. 2014/0352280 of Qi et al. that published on Dec. 4, 2014 (the '280 publication). Specifically, the '280 publication discloses a dosing system having a priming control state and a purging control state that are used to remove trapped air and contaminates from the dosing system.

During the priming control state, a pressure pump tank (PPT) is filled with compressed air via a first air valve, establishing a certain pressure Pc therein. A return valve is then opened, allowing the compressed air to push reductant out of the PPT and back into a reductant tank. When the PPT is empty, compressed air in the PPT will flow into the reductant tank, and a sudden change in pressure inside the PPT will be observed. Upon observing the sudden change in pressure in the PPT, the volume of reductant inside the PPT is determined to be zero and the return valve is closed. Thereafter, the first air valve is adjusted to set the pressure in the PPT to a desired pressure P1, which is lower than the pressure Pc. The first air valve is then closed, and a second air valve is then opened to establish the pressure Pc inside a liquid, supply tank (LST). The pressure gradient between the LST and the PPT causes reductant liquid to flow from the LST into the PPT. By measuring a pressure change in the PPT at this time, the liquid level in the PPT can be calculated. When the liquid volume reaches a value Vh, the second air valve is closed and the LST is allowed to vent. At this same time, the return valve is re-opened for a period of time to release trapped air in passages connecting the PPT to a dosing injector and in return passages and the return valve.

During the purging control state, the first air valve is closed, the second air valve is opened, and the return valve is opened. The resulting pressure of compressed air in the LST pushes reductant from the LST through the PPT and back into the reductant tank via the return valve. When the path from the PPT to the reductant tank is empty, a pressure drop will be detected. When this happens, the return valve is closed, thereby trapping air in the path, in the PPT, and in the LST. To clean the injector, after the return valve is closed and the compressed air is trapped in the path, the injector can be opened for a short period of time allowing remains from the injector to be released into an exhaust pipe.

Although the dosing system of the '280 publication may help to improve dosing precision by implementing priming and purging, the system may still be less than optimal. For example, re-opening the return valve for a period of time to release trapped air may not always provide desired results. Specifically, the period of time could change under different circumstances, leading to either excessive priming that is wasteful or insufficient priming that allows trapped an to remain inside the dosing system. In addition, purging based on any degree of pressure drop could be problematic. For example, it may be possible for one or more of the valves to be stuck in a partially closed position or for a passage to be partially obstructed. In this situation, a pressure drop could still occur, even though the pressure drop would not be the same pressure drop observed in a fully functional system, and the dosing system of the '280 publication could still consider the system to be purged.

The disclosed dosing system is directed to overcoming one or more of the problems set forth above and/or other problems of the prior art

SUMMARY

In accordance with one aspect, the present disclosure is directed toward a reductant dosing system. The reductant dosing system may include a reductant tank, a pump, and a suction passage connecting the pump to the reactant tank. The reductant dosing system may also include an injector, a discharge passage connecting the pump to the injector, a return passage connecting the discharge passage to the reductant tank, and a return valve movable to regulate flow through the return passage. The reductant dosing system may further include an air supply, an air passage connecting the air supply to the injector, and an air valve movable to regulate flow through the air passage. The reductant dosing system may additionally include a first pressure sensor associated with the air passage, a second pressure sensor associated with the discharge passage, and a controller in communication with the first pressure sensor, the second pressure sensor, the air valve, and the return valve. The controller may be configured to calculate a first average pressure inside the discharge passage based on signals from the second pressure sensor while the pump is off, the air valve is open, and the return valve is closed; and to calculate a second average pressure inside the discharge passage based on signals from the second pressure sensor while the pump is off, the air valve is open, and the return valve is open. The controller may also be configured to determine a pressure drop inside the discharge passage based on the first and second average pressures, and to determine that priming of the reductant dosing system is successful based on the pressure drop and pressures of the discharge and air passages while the pump is on, the air valve is open, and the return valve is closed.

According to another aspect, the present disclosure is directed toward another reductant dosing system. This reductant dosing system may include a reductant tank, a pump, and a suction passage connecting the pump to the reductant tank. The reductant dosing system may also include an injector, a discharge passage connecting the pump to the injector, a return passage connecting the discharge passage to the reductant tank, and a return valve movable to regulate flow through the return passage. The reductant dosing system may further include an air supply, an air passage connecting the air supply to the injector, and an air valve movable to regulate flow through the air passage. The reductant dosing system may additionally include a first pressure sensor associated with the air passage, a second pressure sensor associated with the discharge passage, and a controller in communication with the first pressure sensor, the second pressure sensor, the air valve, and the return valve. The controller may be configured to calculate an average pressure inside the discharge passage during a priming mode of operation based on signals from the second pressure sensor while the pump is off, the air valve is open, and the return valve is open. The controller may also be configured to initiate purging of the reductant dosing system by automatically causing the air and return valves to open while the pump is off, and to track a first elapsed time during purging. The controller may be further configured to conclude that purging is complete after a current pressure in the discharge passage exceeds a pressure threshold and the first elapsed time exceeds a first time threshold.

According to yet another aspect, the present disclosure is directed toward a method of controlling a reductant dosing system. The method may include directing reductant from a pump to an injector via a discharge passage, directing reductant from the discharge passage through a return valve to a tank, and directing compressed air through an air valve to the injector via an air passage. The method may also include sensing a first pressure inside the air passage, sensing a second pressure inside the discharge passage, and calculating a first average pressure inside the discharge passage based on the second pressure while the pump is off, the air valve is open, and the return valve is closed. The method may further include calculating a second average pressure inside the discharge passage based on the second pressure while the pump is off, the air valve is open, and the return valve is open. The method may additionally include determining a pressure drop inside the discharge passage based on the first and second average pressures, and determining that priming of the reductant dosing system is successful based on the pressure drop and pressures of the discharge and air passages while the pump is on, the air valve is open, and the return valve is closed.

According to yet another aspect, the present disclosure is directed toward a method for purging a reductant dosing system. The method may include directing reductant from a pump to an injector via a discharge passage, directing reductant from the discharge passage through a return valve to a tank, and directing compressed air through an air valve to the injector via an air passage. The method may also include sensing a first pressure inside the air passage, sensing a second pressure inside the discharge passage, and calculating an average pressure inside the discharge passage during a priming mode of operation based on the second pressure while the pump is off, the air valve is open, and the return valve is open. The method may further include initiating purging of the reductant dosing system by automatically causing the air and return valves to open while the pump is off, and tracking a first elapsed time during purging. The method may additionally include concluding that purging is complete after a current pressure in the discharge passage exceeds a pressure threshold and the first elapsed time exceeds a first time threshold.

DETAILED DESCRIPTION

Figure 1:
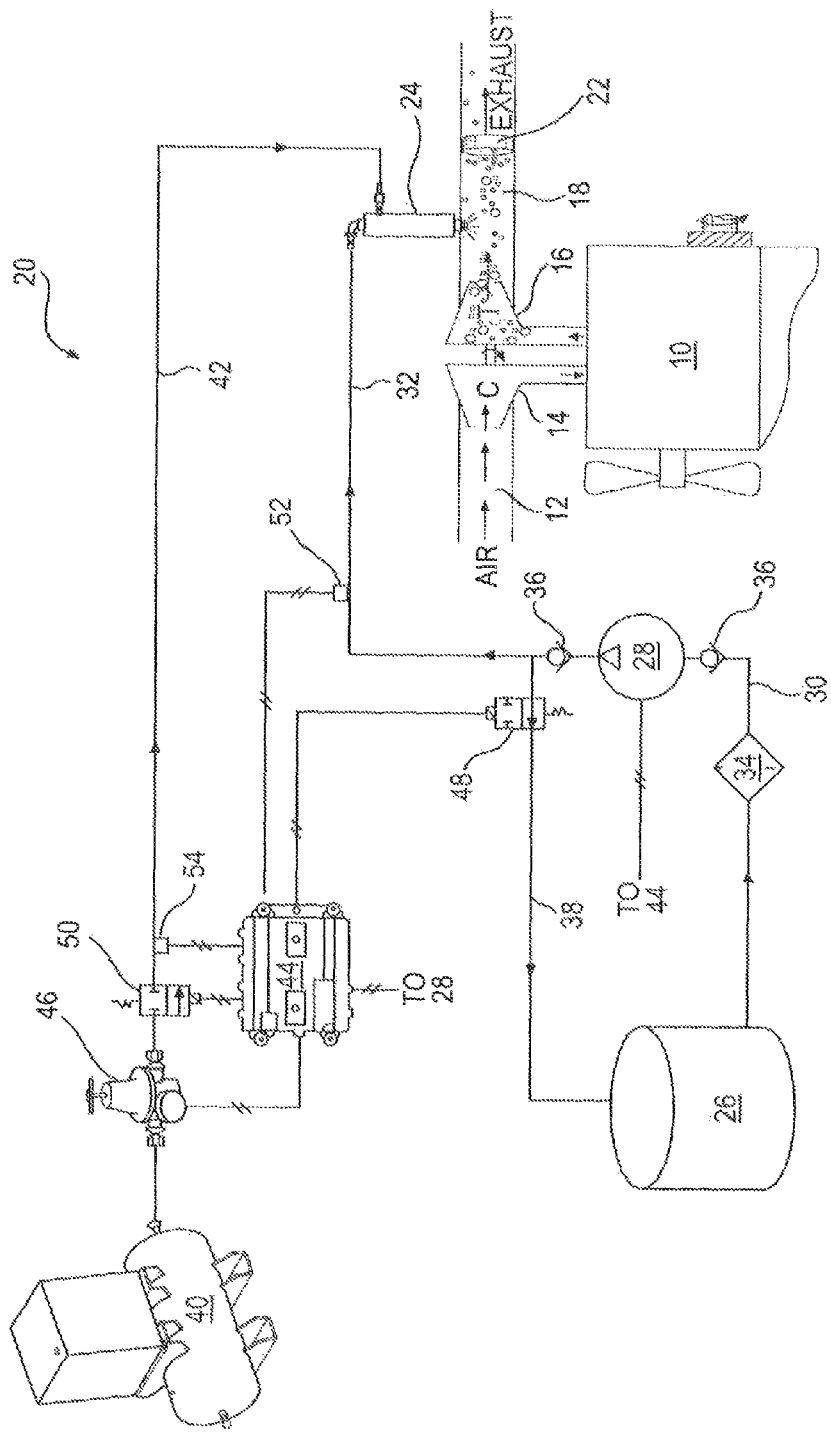
FIG. 1 is a schematic illustration of an engine equipped with an exemplary disclosed dosing system.

FIG. 1 illustrates an exemplary engine 10. For the purposes of this disclosure, engine 10 is depicted and described as an internal combustion engine. It is contemplated that engine 10 may embody any type of internal combustion engine known in the art such as, for example, a naturally aspirated engine, a supercharged engine, or a turbocharged engine that is configured to burn diesel, gasoline, a gaseous fuel (e.g., compressed or liquefied natural gas, propane, or methane), or a mixture of different fuels. Engine 10 may include any number of combustion chambers (not shown) that are disposed in any conventional configuration. The combustion chambers of engine 10 may receive inlet air via an inlet passage 12 and a compressor 14, and discharge exhaust from the combustion chambers to the atmosphere via a turbine 16 and an outlet passage 18.

A reductant dosing system ("system") 20 may be associated within engine 10 and include components configured to trap, catalyze, reduce, and/or otherwise remove the regulated constituents from the exhaust flow of engine 10 prior to discharge into the atmosphere. These components may include, among other things, one or more reduction substrates 22 disposed within outlet passage 18 downstream of an associated injector 24. With this arrangement, a gaseous or liquid reductant, most commonly urea ($(NH_2)_2CO$), a water/urea mixture, a hydrocarbon such as diesel fuel, or ammonia gas ($NH_3$), may be sprayed or otherwise advanced into the exhaust flow of outlet passage 18 at a location upstream of reduction catalyst(s) 22 by injector 24. If more than one reduction catalyst 22 is included, reduction substrates 22 may be arranged into bricks or packs, which are placed in parallel and/or series relative to the flow of exhaust through outlet passage 18. Many different configurations may be possible.

To facilitate dosing of reduction catalyst(s) 22 by injector 24, an onboard reservoir 26 of reductant and a pressurizing device (e.g., a pump) 28 may be associated with injector 24. Reservoir 26 may be connected to pump 28 by way of a suction passage 30; and pump 28 may be connected to injector 24 by way of a discharge passage 32. A filter 34 may be disposed between reservoir 26 and pump 28 (i.e., within suction passage 30), if desired. In some embodiments, a single reservoir 26 and/or a single pump 28 may be associated with multiple injectors 24. In the disclosed embodiment, however, a single injector 24 is shown as being provided with reductant from a dedicated reservoir 26 and a dedicated pump 28. The reductant sprayed into outlet passage 18 by injector 24 may flow downstream with the exhaust from engine 10 and be adsorbed onto an upstream surface of reduction catalyst(s) 22, where the reductant may react with $NO_X$ (NO and $NO_2$) in the exhaust gas to form water ($H_2O$) and elemental nitrogen ($N_2$) both of which may be unregulated.

Reservoir 26 may include one or more connected low-pressure tanks (e.g., a storage tank and a day tank) that are configured to store reductant. Pump 28 may be a metering pump such as, for example, a diaphragm pump, a piston pump, or a rotary pump that draws reductant from the tanks (e.g., from the day tank). Filter 34 may be a device configured to remove ice crystals and/or debris from a flow of reductant generated by pump 28. As pump 28 draws reductant from reservoir 26, a portion of the reductant may freeze or already be frozen. This frozen reductant may be collected upstream of pump 28 at filter 34.

One or more check valves 36 may be associated with pump 28 and configured to provide for a unidirectional flow of reductant through passages 30 and 32. Two check valves 36 are utilized in the disclosed embodiment, wherein one check valve 36 is located upstream of pump 28 and the check valve 36 is located downstream of pump 28. It is contemplated that a different number and/or configuration of check valves may be included within system 20, if desired.

A return passage 38 may connect discharge passage 32 with the tank(s) of reservoir 26, in some embodiments. Return passage 38 may communicate with discharge passage 32 at a location downstream of any associated check valves 36, and function to allow reductant pressurized by pump 28 in excess of what is needed for $NO_x$ reduction to return to reservoir 26. As will be explained in more detail below, return passage 38 may additionally be used for priming and/or purging of system 20.

Injector 24 may be an air-assisted injector. Specifically, injector 24 may use pressurized air to atomize and disperse the reductant within outlet passage 18 in such a manner that the reductant is homogenously received by catalyst 22. The pressurized air may be directed from an air source 40 to injector 24 via an air passage 42. Air source 40 may include, for example, a compressor that is driven by engine 10 to fill an associated tank, which communicates with air passage 42.

Figure 2:
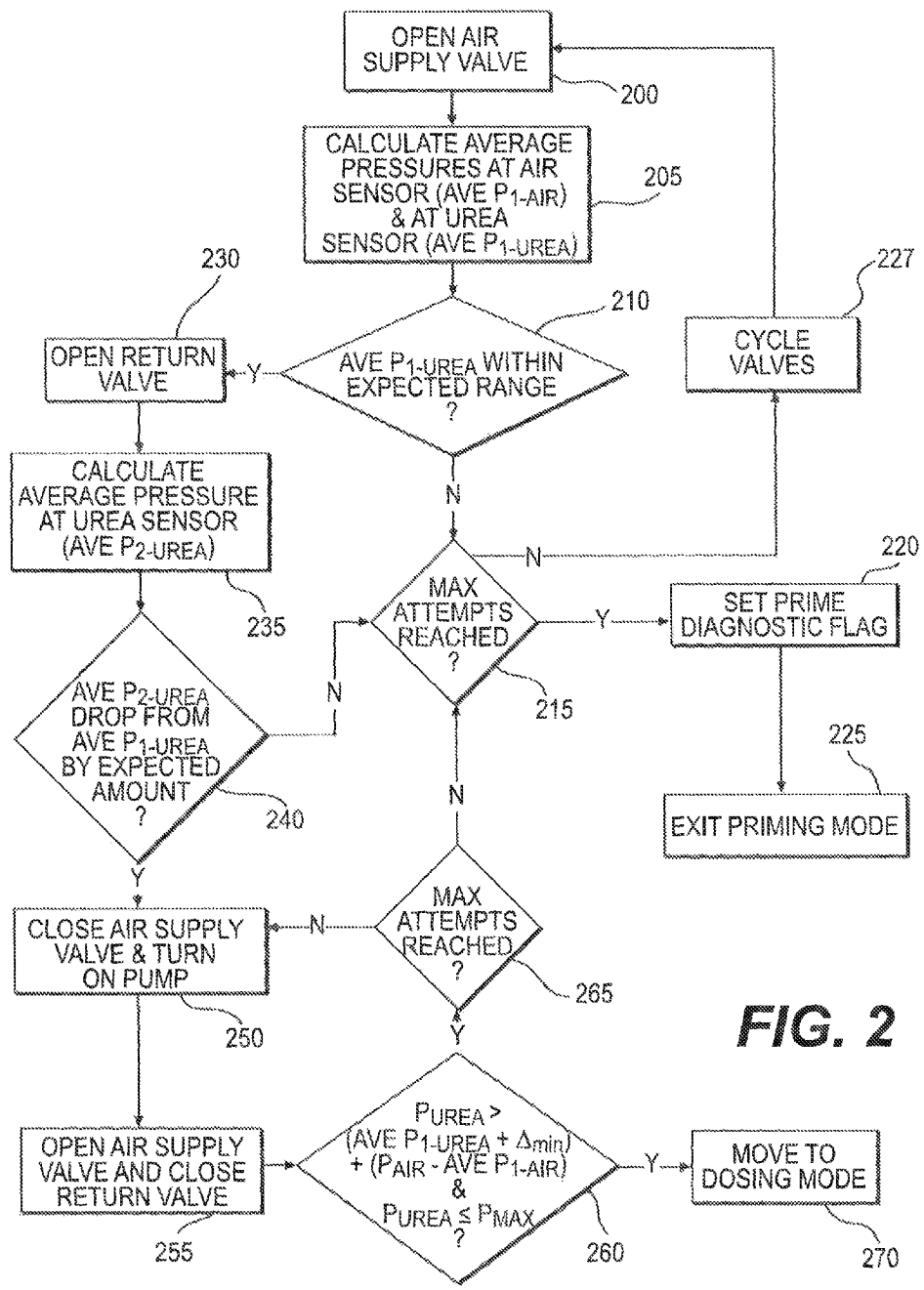
FIG. 2 is a flowchart depicting an exemplary priming process associated with the dosing system of FIG. 1.

System 20 may be controlled to selectively implement several different modes of operation, including a priming mode, a dosing mode, and a purging mode. To facilitate this control, system 20 may further include a controller 44, a regulator 46, a return valve 48, an air valve 50, a urea pressure sensor 52, and an air pressure sensor 54. Controller 44 in communication with each of the other control components, and configured to selectively activate regulator 46 and return and air valves 48, 50 based on signals received from urea and air pressure sensors 52, 54. This control will be described in more detail in the following section with reference to FIGS. 2 and 3.

Controller 44 may be any type of programmable logic controller known in the art for automating machine processes such as, for example, an engine control unit (ECU). As an ECU, controller 44 may include a memory, a secondary storage device, a clock, and a single or multiple microprocessors, such as a central processing unit or any other means for accomplishing a task consistent with the present disclosure. Numerous commercially available microprocessors can be configured to perform the functions of controller 44. It should be appreciated that controller 44 could readily embody a general engine controller capable of controlling numerous other engine functions. Various other known circuits may be associated with controller 44, including signal-conditioning circuitry, communication circuitry, and other appropriate circuitry.

Regulator 46 may mechanically maintain a pressure within air passage 42 appropriate for the reductant, priming, dosing, and purging processes. For example, regulator 46 may be a type of valve that moves to adjust air flow through passage 42 when a pressure of the air flow deviates from a desired pressure (i.e., falls below a low- and/or exceeds a high-pressure threshold). In some embodiments, regulator 46 may be a fixed pressure regulator configured to consistently allow air flow through passage 42 only when the air flow is within a desired pressure range. In other embodiments, however, regulator 46 may be a variable pressure regulator configured to be adjustable for different desired pressure ranges. If embodied as a variable pressure regulator, regulator 46 may be manually adjustable and/or automatically adjustable by controller 44.

Each of valves 48 and 50 may be a solenoid-type valve having an element that is movable between multiple different positions to allow, block, and/or meter fluid flow through the associated passages. In the disclosed embodiment, the elements of valves 48, 50 are each two-position elements movable from a distinct flow-blocking position to a distinct flow-passing position (i.e., without a metering position). The element of return valve 48 may be spring-biased toward the flow-passing position, while the element of air valve 50 may be spring-biased toward the flow-blocking position. Both of the elements of return and air valves 48, 50 may be movable to the opposite positions when energized by (i.e., in response to command signals from) controller 44. Other configurations of valves may also be possible.

Pressure sensors 52 and 54 may each be configured to generate signals indicative of a pressure of fluid passing through the respective passages 32 and 42. Signals generated by pressure sensors 52 and 54 may be directed to controller 44 for use in regulating operation of valves 48 and 50 (and in sonic embodiments, also regulator 46).

INDUSTRIAL APPLICABILITY

The disclosed reductant dosing system may be used in any power system application where dosing precision is important. The disclosed reductant dosing system may improve dosing precision by implementing unique priming and purging processes. Operation of dosing system 20 will now be described with reference to FIGS. 2 and 3.

As described above, system 20 may be operable in a priming mode, a dosing mode, and a purging mode. At initiation of the priming mode of operation, pump 28 should be turned off and all passages of system 20 should be empty of reductant, assuming that a previously implemented purge mode of operation was completed successfully. During the priming mode of operation, controller 44 may command the element of air supply valve 50 to move to its flow-passing position, thereby opening the connection between air source 40 and injector 24 (Step 200). The compressed air from source 40 may flow through passage 42 and injector 24 to enter passage 32 in reverse direction. Sensors 52 and 54 may both be functional at this time, generating signals indicative of the pressures within passages 32 and 42, respectively. Controller 44 may then calculate an average pressure value over a predefined period of time (e.g., about 0-5 seconds) for each of passages 32, 42 (Step 205). These pressure values may be represented by the variables AVE $P_{1\text{-}UREA}$ and AVE $P_{1\text{-}AIR}$, respectively.

Controller 44 may compare AVE $P_{1-UREA}$ to an expected range of values (Step 210), to determine if system 20 is fully functional. In particular, if AVE $P_{1-UREA}$ is low, it could signify that return valve 48 is partially open, that a rupture has occurred at some location within system 20, that injector 24 is at least partially clogged and preventing air flow into passage 32, or that another anomaly has occurred. In contrast, if AVE $P_{1-UREA}$ is high, it could signify that that an end-cap of injector 24 is plugged, thereby inhibiting leakage of air into exhaust passage 18. The low- and high-pressure thresholds used for this comparison may vary and be taken from a map stored in them memory of controller 44. When controller 44 determines that AVE $P_{1-UREA}$ is not within the expected range of values (Step 210:N), controller 44 may compare a number of attempts to complete step 210 with a maximum number of attempts (Step 215). If the number of attempts to complete step 210 is less than the maximum number of attempts (Step 210: N), controller 44 may cycle return and air valves 48, 50 (e.g., to unstick the valves—Step: 227) and then return to step 200. Otherwise, controller 44 may set a diagnostic flag (Step 220) and exit the priming mode of operation (Step 225).

When step 210 is successfully completed (Step 210: Y), controller 44 may command the element of return valve 48 to open (Step 230), and then calculate for a second time the average pressure inside passage 32 (Step 235). This pressure value may be represented by the variables AVE $P_{2-UREA}$. The opening of return valve 48 may allow the compressed air inside passage 32 to flow through passage 38 and into reservoir 26. Because reservoir 26 may provide an outlet for the compressed air (i.e. because the compressed air may no longer "dead-head" within passage 32), AVE $P_{2-UREA}$ should be lower than AVE $P_{1-UREA}$. Accordingly, controller 44 may determine if AVE $P_{2-UREA}$ has dropped below AVE $P_{1-UREA}$ by an expected amount (Step 240). When controller 44 determines that AVE $P_{2-UREA}$ has not dropped below AVE $P_{1-UREA}$ by the expected amount (Step 240:N), control may cycle to step 215 described above, where controller 44 may compare a number of attempts to complete step 240 with a maximum number of attempts. If the number of attempts to complete step 240 is less than the maximum number of attempts (Step 215: N), control may cycle back through step 227 to step 200. Otherwise, controller 44 may set a diagnostic flag and exit the priming mode of operation (i.e., control may proceed to steps 220 and 225 described above).

When step 240 is successfully completed (Step 240: Y), controller 44 may command the element of air supply valve 50 to close and command pump 28 to turn on and begin pumping reductant (Step 250). Return valve 48 may still be open at this time, allowing the reductant to flow through passage 38, thereby pushing the air from passage 38 into reservoir 26. At this same time, the reductant may also be allowed to flow through passage 32 to injector 24, thereby pushing the air from passage 32 out through injector 24. Reductant may be allowed to flow through passages 32 and 38 for a period of time that should allow for complete filling of these passages. Because of the unrestricted flow of reductant through passage 38 to reservoir 26, however, the reductant within passage 32 may not build to a significant pressure.

After completion of step 250, controller 44 may then command the element of air supply valve 50 to open and the element of return valve 255 to close (Step 255). With return valve 255 being closed and pressurized air being delivered to injector 24, the pressure of reductant within passage 32 should build by a certain amount and be somewhat related to the pressure of the air in passage 42. Accordingly, controller 44 may check for proper priming of system 20 by making a comparison of the current pressure in passage 32 ($P_{UREA}$) with AVE $P_{1-UREA}$, a minimum expected change in pressure ($\Delta_{MIN}$), the current air pressure in passage 42 ($P_{AIR}$), AVE $P_{1-AIR}$, and a maximum allowed reductant pressure ($P_{MAX}$) (Step 260). In particular, controller 44 may conclude that system 20 has been properly primed only when $P_{UREA}$ is greater than (AVE $P_{1-UREA}+\Delta_{MIN}$)+($P_{AIR}-$AVE $P_{1-AIR}$), and $P_{UREA}$ is less than or equal to $P_{MAX}$. When completing this step, the term (AVE $P_{1-UREA}+\Delta_{MIN}$) may represent the original average air pressure attained inside discharge passage 32 plus some minimum acceptable change (e.g., an application-dependent constant). The term ($P_{AIR}-$AVE $P_{1-AIR}$) may be a correction term that accounts for changes in air pressure from source 40 that occurs during the priming process. By taking into account these two terms, controller 44 may be ensuring that the pressure of urea in passage 32 rises above the original air pressure (indicating that no more air exists in passages 32 or 38), while also accounting for system variability. The term $P_{MAX}$ may be a pressure level above which malfunction of system 20 can be confidently concluded and/or above which system 20 is likely to experience a malfunction. In one embodiment, when $P_{UREA}$ is greater than $P_{MAX}$ only when the end cap of injector 24 is plugged.

Each time that controller 44 determines that the conditions of step 260 are false (step 260: N), controller 44 may compare a number of attempts to complete step 260 with a maximum number of attempts (Step 265). If the number of attempts to complete step 260 is less than the maximum number of attempts (Step 265: N), control may cycle back to step 250. Otherwise, controller 44 may compare a number of times that control has cycled through steps 250-265 with a maximum number of attempts during step 215 described above. If the number of attempts to complete steps 250-265 is less than the maximum number of attempts (Step 215: N), control may cycle through step 227 back to step 200. Otherwise, controller 44 may set a diagnostic flag and exit the priming mode of operation (i.e., control may proceed to steps 220 and 225 described above).

However, when controller 44 determines that the conditions of step 260 are true (step 260: Y), controller 44 may actively transition to the dosing mode of operation (Step 270). In some embodiments, the conditions of step 260 must remain true for at least a minimum period of time (e.g., about 1 sec.) before control may proceed to step 270.

Reductant dosing may be initiated in response to any triggering event known in the art. For example, when temperatures within passage 18 exceed a threshold temperature (e.g., about 250° C.), controller 44 may command the element of air supply valve 50 to open and also activate pump 28 to simultaneously cause air and reductant to flow toward injector 24 via passages 42 and 32, respectively. As engine 10 produces exhaust, the reductant may be atomized by the compressed air and sprayed into passage 18 to react with $NO_x$ at catalyst substrate 22, thereby affecting a selective catalytic reduction (SCR) of the $NO_x$.

Dosing may be stopped and purging may also be initiated in response to any triggering event known in the art. For example, when a temperature within passage 18 falls below the threshold temperature, purging may begin. Additionally or alternatively, purging may begin anytime engine 10 shuts down or begins a shutdown sequence. In yet another example, purging may be initiated after a time period or amount of reductant dosing has taken place. Other triggering conditions may also be possible.

Figure 3:
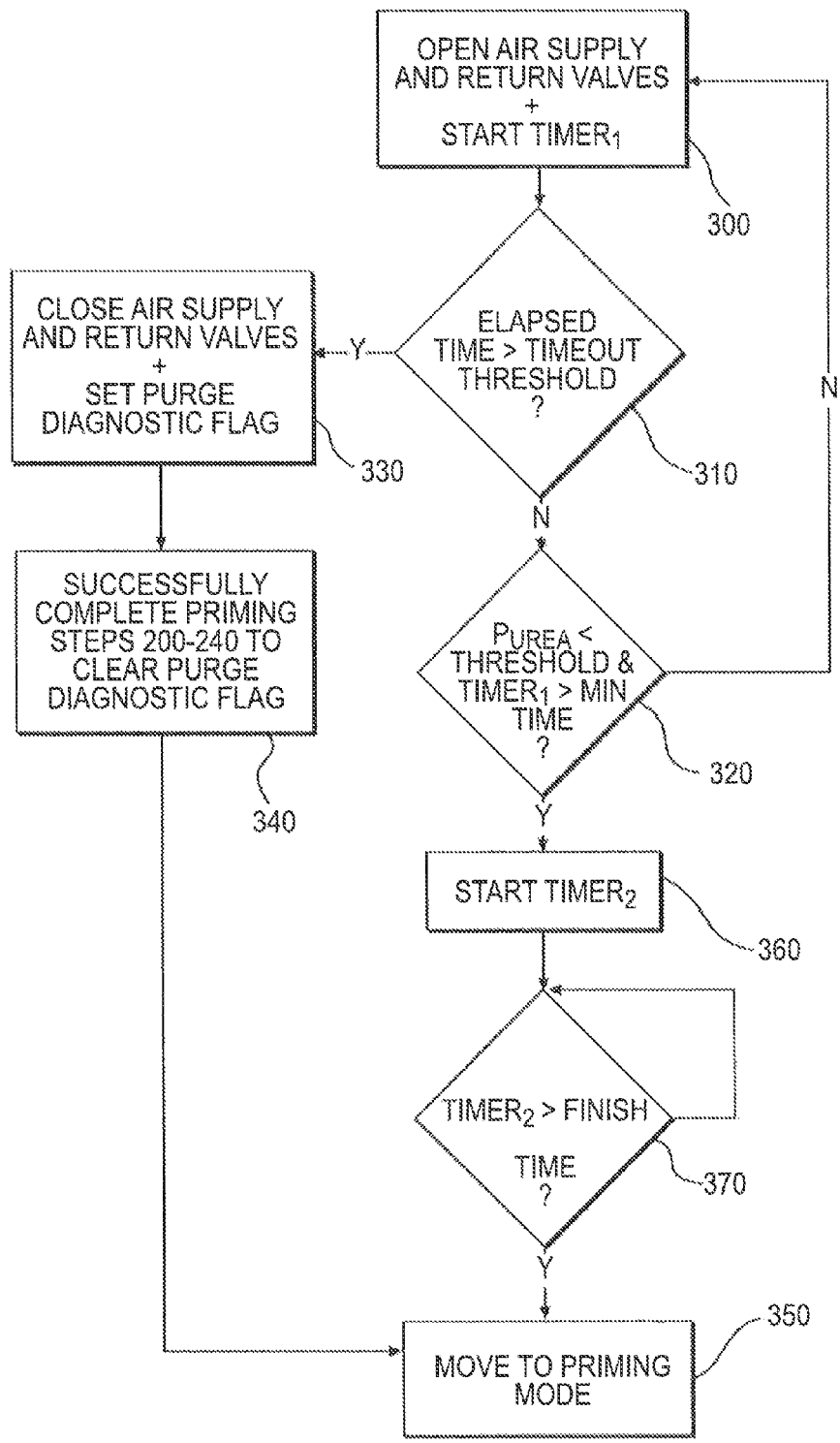
FIG. 3 is another flowchart depicting an exemplary purging process associated with the dosing system of FIG. 1.

With regard to the embodiment of FIG. 3, purging may be initiated to inhibit damage and/or clogging of dosing components due to contamination (e.g., freezing or the formation of polymers) inside passage 18. The purging process may begin with controller 44 commanding the elements of air supply and return valves 50, 48 to their open and flow-passing positions and also starting an internal timer to track an elapsed period of time (Step 300). Similar to the first part of the priming process described above, the simultaneous opening of supply and return valves 50, 48 may cause compressed air from source 40 to flow through passage 42, injector 24, passage 32, and passage 38 into reservoir 26, thereby pushing out any reductant from the components of system 20.

While the reductant is being pushed out of the components of system 20, controller 44 may compare the elapsed time to a timeout threshold (Step 310), and then determine if the current pressure in passage 42 ($P_{UREA}$) is less than a threshold pressure and if the elapsed amount of time is greater than a minimum amount of time (Step 320). In one embodiment, the timeout threshold is about 90 seconds or a maximum amount of time that should ever elapse during a normal purge event. The pressure comparison may be used to determine when reductant in passage 52 has been replaced with air and to see if return and air supply valves 48, 50 are functioning properly, as may be indicated by a drop in pressure. The threshold pressure may be a function of the air pressure measured at urea pressure sensor 52. For example, in one embodiment, the threshold pressure is the same pressure (AVE $P_{2\text{-}UREA}$) experienced during completion of step 240 of the priming process described above. In another embodiment, the threshold pressure is the low-pressure threshold used for comparison in step 210 described above. In yet another embodiment, the pressure threshold is a fixed value pressure. The minimum amount of time may be a minimum amount of time that should ever elapse before completion of a normal purge event.

Control may cycle through steps 300-320 until either the elapsed time exceeds the timeout threshold (step 310: Y) or until $P_{UREA}$ is less than the threshold and the elapsed time exceeds the minimum time threshold (step 320: Y). Specifically, when the elapsed time exceeds the timeout threshold at step 310, controller 44 may conclude that something is inhibiting the reductant from being properly pushed out of the components of system 20. This may occur, for example if return valve 48 were to be stuck in a closed or partially closed position or when a passage (e.g., one or both of passages 32, 38) is clogged. In this situation, controller 44 may command the elements of air supply and return valves 50, 48 to move to their closed and flow-blocking positions, and also set a purge diagnostic flag (Step 330). In some embodiments, the purge diagnostic flag may be removed by successful completion of priming steps 200-240 described above (Step 340). Thereafter, control may move to the priming mode of operation (Step 350).

Returning to step 320, when controller 44 determines that $P_{UREA}$ is less than the threshold pressure and that the elapsed amount of time is greater than the minimum amount of time (step 320: Yes), controller 44 may start a second timer (Step 360). Controller 44 may thereafter compare a second amount of elapsed time to a finish time threshold (Step 370), and control may cycle through step 370 until the condition is true (i.e., until step 370: Y). Note that during completion of steps 360 and 370, air supply and return valves 50, 48 may still be open, allowing for compressed air to flow through the components of system 20 and into reservoir 26 even after controller has determined that reductant no longer exists in the components. In one embodiment, the finish time threshold may be about 0-3 sec. This additional time of airflow may help to remove residual drops of reductant that may be clinging to walls of the components. Control may proceed from step 370 to step 350.

The disclosed, dosing system may improve dosing precision by ensuring that the associated components are properly primed before actively dosing, and properly purged thereafter. Specifically, because the disclosed system may rely on relative before/after pressure measurements as thresholds in determining when the components have been properly primed, any inherent system and application variability may have little effect on the priming. This may increase priming efficiency by ensuring that priming extends just long enough to remove trapped air from the system. In addition, purging based on relative before/after pressure drops may help to ensure that purging is successfully completed without interference or confusion caused by a system malfunction.

It will be apparent to those skilled in the art that various modifications and variations can be made to the disclosed dosing system. Other embodiments will be apparent to those skilled in the art from consideration of the specification and practice of the disclosed dosing system. It is intended that the specification and examples be considered as exemplary only, with a true scope being indicated by the following claims and their equivalents.

What is claimed is:

1. A reductant dosing system, comprising:
   a reductant tank;
   a pump;
   a suction passage connecting the pump to the reductant tank;
   an injector;
   a discharge passage connecting the pump to the injector;
   a return passage connecting the discharge passage to the reductant tank;
   a return valve movable to regulate flow through the return passage;
   an air supply;
   an air passage connecting the air supply to the injector;
   an air valve movable to regulate flow through the air passage;
   a first pressure sensor associated with the air passage;
   a second pressure sensor associated with the discharge passage; and
   a controller in communication with the first pressure sensor, the second pressure sensor, the air valve, and the return valve, the controller being configured to:
      calculate a first average pressure inside the discharge passage based on signals from the second pressure sensor while the pump is off, the air valve is open, and the return valve is closed;
      calculate a second average pressure inside the discharge passage based on signals from the second pressure sensor while the pump is off, the air valve is open, and the return valve is open;
      determine a pressure drop inside the discharge passage based on the first and second average pressures; and
      determine that priming of the reductant dosing system is successful based on the pressure drop and pressures of the discharge and air passages while the pump is on, the air valve is open, and the return valve is closed.

2. The reductant dosing system of claim 1, wherein the controller is configured to initiate priming of the reductant dosing system by automatically causing the air and return valves to move between open and closed positions and the pump to turn on and off.

3. The reductant dosing system of claim 2, wherein when the pump is turned off and the air and return valves are open, compressed air from the air supply flows through the discharge and return passages into the reductant tank.

4. The reductant dosing system of claim 3, wherein the pressure drop is indicative of the discharge passage being free of reductant and of proper operation of the air and return valves.

5. The reductant dosing system of claim 4, wherein when the controller determines that the compressed air has replaced the reductant inside the discharge passage, the controller may be configured to cause the air valve to close and the pump to turn on for a period of time to cause reductant to flow from the pump back into the reductant tank.

6. The reductant dosing system of claim 5, wherein when the controller determines that the reductant from the pump has reached the reductant tank, the controller may be configured to cause the return valve to close and the air valve to re-open.

7. The reductant dosing system of claim 6, wherein the controller is configured to:
   calculate a third average pressure inside the air passage based on signals from the first pressure sensor while the pump is off, the air valve is open, and the return valve is closed; and
   determine that priming of the reductant dosing system is successful when a current pressure of the discharge passage sensed after the return valve has closed and the air valve has re-opened is greater than the first average pressure plus a detected change between a current pressure of the air passage and the third average pressure.

8. The reductant dosing system of claim 6, wherein the controller is further configured to determine that priming of the reductant dosing system is successful only when the current pressure inside the air passage is also less than or equal to a maximum pressure.

9. The reductant dosing system of claim 2, wherein the controller is further configured to initiate purging of the reductant dosing system by automatically causing the air and return valves to move between open and closed positions and the pump to turn on and off.

10. The reductant dosing system of claim. 9, wherein the controller is configured to:
    cause the air and return valves to open while the pump is off during purging;
    track a first elapsed time during purging; and
    conclude that purging is complete after a current pressure in the discharge passage is less than a threshold pressure and the first elapsed time exceeds a first time threshold.

11. The reductant dosing system of claim 10, wherein, the controller is further configured to:
    track a second elapsed time after the current pressure in the discharge passage is less than the threshold pressure and after the first elapsed time exceeds the first time threshold; and
    conclude that purging is complete only after the second elapsed time exceeds a second time threshold.

12. A reductant dosing system, comprising:
    reductant tank;
    a pump;
    a suction passage connecting the pump to the reductant tank;
    an injector;
    a discharge passage connecting the pump to the injector;
    a return passage connecting the discharge passage to the reductant tank;
    a return valve movable to regulate flow through the return passage;
    an air supply;
    an air passage connecting the air supply to the injector;
    an air valve movable to regulate flow through the air passage;
    a first pressure sensor associated with the air passage;
    a second pressure sensor associated with the discharge passage; and
    a controller in communication with the first pressure sensor, the second pressure sensor, the air valve, and the return valve, the controller being configured to:
        calculate an average pressure inside the discharge passage during a priming mode of operation based on signals from the second pressure sensor while the pump is off, the air valve is open, and the return valve is open;
        initiate purging of the reductant dosing system by automatically causing the air and return valves to open while the pump is off;
        track a first elapsed time during purging; and
        conclude that purging is complete after a current pressure in the discharge passage is less than a threshold pressure and the first elapsed time exceeds a first time threshold.

13. The reductant dosing system of claim 12, wherein the controller is further configured to:
    track a second elapsed time after the current pressure in the discharge passage is less than the pressure threshold and after the first elapsed time exceeds the first time threshold; and
    conclude that purging is complete only after the second elapsed time exceeds a second time threshold.

14. A method of controlling a reductant dosing system, comprising:
    directing reductant from a pump to an injector via a discharge passage;
    directing reductant from the discharge passage through a return valve to a tank;
    directing compressed air through an air valve to the injector via an air passage;
    sensing a first pressure inside the air passage;
    sensing a second pressure inside the discharge passage;
    calculating a first average pressure inside the discharge passage based on the second pressure while the pump is off, the air valve is open, and the return valve is closed;
    calculating a second average pressure inside the discharge passage based on the second pressure while the pump is off, the air valve is open, and the return valve is open;
    determining a pressure drop inside the discharge passage based on the first and second average pressures; and
    determining that priming of the reductant dosing system is successful based on the pressure drop and pressures of the discharge and air passages while the pump is on, the air valve is open, and the return valve is closed.

15. The method of claim 14, further including initiating priming of the reductant dosing system by automatically causing the air and return valves to move between open and closed positions and the pump to turn on and off.

16. The method of claim 15, wherein When the pump is turned off and the air and return valves are open, reductant inside the discharge and return passages is forced back into a reductant tank by compressed air from the air passage.

17. The method of claim 16, wherein the pressure drop is indicative of compressed air replacing reductant inside the discharge passage.

18. The method of claim 17, wherein when it is determined that the compressed air has replaced the reductant inside the discharge passage, the method further includes causing the air valve to close and the pump to turn on for a period of time to cause reductant to flow from the pump back into the reductant tank.

19. The method of claim 18, wherein when it is determined that the reductant from. the pump has reached the reductant tank, the method further includes causing the return valve to close and the air valve to re-open.

20. The method of claim 19, further including:
calculating a third average pressure inside the air passage based on the first pressure sensed while the pump is off, the air valve is open, and the return valve is closed; and
determining that priming of the reductant dosing system is successful when a current pressure of the discharge passage sensed after the return valve has closed and the air valve has re-opened is greater than the first average pressure plus a detected change between a current pressure of the air passage and the third average pressure.

21. The method of claim 20, wherein determining that priming of the reductant dosing system is successful includes determining that priming of the reductant dosing system is successful only when the current pressure inside the air passage is also less than or equal to a maximum pressure.

22. The method of claim 15, further including initiating purging of the reductant dosing system by automatically causing the air and return valves to move between open and closed positions and the pump to turn on and off.

23. The method of claim 22, further including:
causing the air and return valves to open while the pump is off during purging;
tracking a first elapsed time during purging; and
concluding that purging is complete after a current pressure in the discharge passage is less than a threshold pressure and the first elapsed time exceeds a first time threshold.

24. The method of claim 23, further including tracking a second elapsed time after the current pressure in the discharge passage exceeds the threshold pressure and after the first elapsed time exceeds the first time threshold, wherein concluding that purging is complete includes concluding that purging is complete only after the second elapsed time exceeds a second time threshold.

25. A method of controlling a reductant dosing system, comprising:
directing reductant from a pump to an injector via a discharge passage;
directing reductant from the discharge passage through a return valve to a tank;
directing compressed air through an air valve to the injector via an air passage;
sensing a first pressure inside the air passage;
sensing a second pressure inside the discharge passage;
calculating an average pressure inside the discharge passage during a priming mode of operation based on the second pressure while the pump is off, the air valve is open, and the return valve is open;
initiating purging of the reductant dosing system by automatically causing the air and return valves to open while the pump is off;
tracking a first elapsed time during purging; and
concluding that purging is complete after a current pressure in the discharge passage is less than a pressure threshold and the first elapsed time exceeds a first time threshold.

26. The method of claim 25, further including tracking a second elapsed time after the current pressure in the discharge passage exceeds the average pressure and after the first elapsed time exceeds the first time threshold, wherein concluding that purging is complete includes concluding that purging is complete only after the second elapsed time exceeds a second time threshold.

* * * * *